March 18, 1930.  F. SIGRIST ET AL  1,750,692
SKELETON STRUCTURE SUCH AS AIRCRAFT FUSELAGE
Filed Feb. 25, 1928
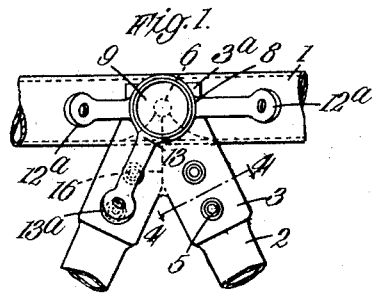
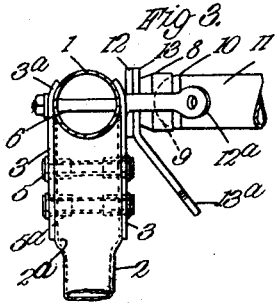
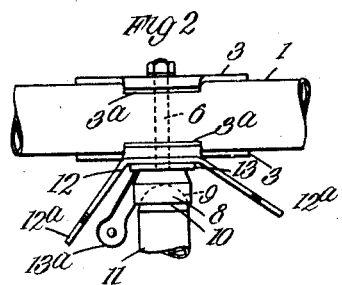
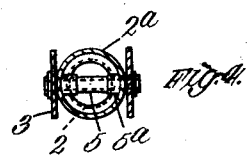
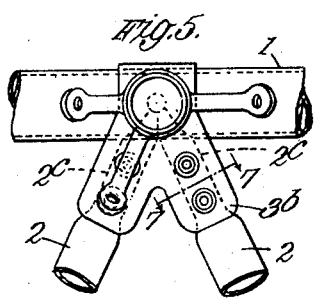
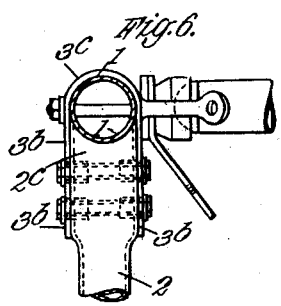
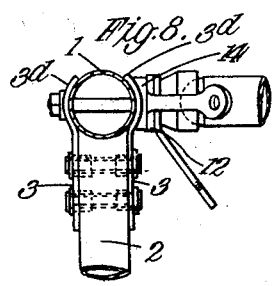
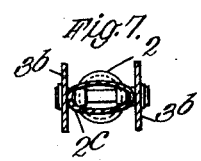
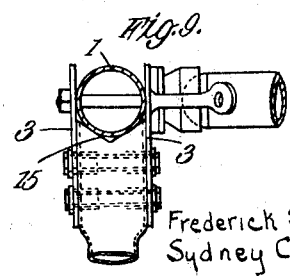
Frederick Sigrist
Sydney Camm
INVENTORS
By Otto Munk
their Atty.

Patented Mar. 18, 1930

1,750,692

UNITED STATES PATENT OFFICE

FREDERICK SIGRIST, OF OXSHOTT, AND SYDNEY CAMM, OF LONG DITTON, ENGLAND

SKELETON STRUCTURE SUCH AS AIRCRAFT FUSELAGE

Application filed February 25, 1928, Serial No. 256,886, and in Great Britain December 23, 1927.

The present invention relates to skeleton structures and more particularly to aircraft fuselages constructed of metal tubular members, in which connection it will hereinafter be described.

The primary object of the invention is to provide an aircraft fuselage with efficient and easily made joints at points where a tubular member or members such as interlongéron struts or bracing members meet another tubular metal member such as a longéron with the ends of the former member or members abutting against the latter member or longéron at an intermediate point in its length. A further object is to combine with the joint means for engagement with another tubular member transverse to the first mentioned member or members and the second mentioned member; and an ultimate object is to provide an aircraft fuselage which is of simple, light and economical construction.

According to the invention the joint hereinbefore referred to comprises a flat, curved or like clamping plate or a pair of similar plates, or a clamping plate of U-shape bolted or riveted to the first mentioned metal tubular member or members such as an interlongéron strut or bracing member or members, and secured to the second mentioned member such as a longéron by a single bolt therethrough transverse to the said second mentioned member or longéron and the said first mentioned member or members. The said bolt may be formed or provided with means to engage another or transverse tubular member and preferably in such manner that the latter can be engaged therewith as a strut and freed therefrom by releasing the bracing wires. Thus the head of the bolt may be cup shaped to engage a ball shaped end of a transverse strut, or ball shaped to engage a cup shaped end of a transverse strut.

The said clamping plate or plates may be shaped to conform to the surface of the tubular members, or they may be flat, and in the latter case if desired intermediate spacing blocks flat on one side and shaped to the tubes on an opposite side may be interposed between the clamping plate or plates and the tubular members. The said members may be of the same or of different diameters and in the latter case the plate or plates may be shaped accordingly or the tube or tubes of smaller diameter may be expanded or compressed to provide at the joint a transverse dimension equal to that of the member or members of larger diameter.

An aircraft fuselage according to the invention may comprise two sides each formed as a girder such for instance as a Pratt or Warren girder with top and bottom longérons forming the top and bottom booms thereof, the interlongéron members of each such side being connected together and to the longérons as hereinbefore specified, and the two sides being spaced apart by transverse interlongéron struts braced by wires, the bolts through the longérons at the joints being provided with cup shaped ends to engage ball shaped ends of the transverse struts or with ball shaped ends to engage cup shaped ends of the transverse struts.

In order that the invention may be fully understood and readily carried into effect it will now be described with reference to the accompanying drawings which illustrate by way of example various forms of joint between a longéron of a Warren girder structure and the interlongéron struts or bracing members thereof.

Figures 1-4 inclusive illustrate one form of joint, Figure 1 being a side elevation, Figure 2 a plan, Figure 3 a side elevation and Figure 4 a section on the line 4—4 of Figure 1.

Figures 5-7 inclusive illustrate another form of joint, Figure 5 being a side elevation, Figure 6 an end elevation and Figure 7 a section on the line 7—7 of Figure 5.

Figures 8 and 9 are end views of two more forms of joint.

Referring to Figures 1-4 inclusive, 1 is the top longéron of a side of a fuselage of Warren girder formation, 2, 2 being struts or bracing members which are of smaller diameter than the longéron. At their ends 2ª where they abut against the latter they are cylindrically expanded to the same diameter as the longéron. The joint is made by means of two plates 3 one on either side which are connected to the ends 2ª of the struts by tubular rivets 5 which may be expanded into ferrules 5ª placed in the holes in the clamping plates and tubes and to the longéron by a single bolt 6. The plates 3 are in general of flat shape as appears more clearly from Figure 4 but at their upper parts 3ª they are curved over to conform to the surface of the longéron. The bolt 6 is provided with a head 8 which is cupped at 9 to engage the ball shaped end 10 of a transverse member 11 which constitutes one of the struts in the upper horizontal frame of the fuselage. For clearness of illustration this strut is omitted from Figure 1. Wiring plates 12 and 13 having lugs 12ª and 13ª respectively are threaded on to the bolt and clamped between the bolt head 8 and a plate 3 on one side of the joint for attachment of the wire bracing.

Figures 5, 6 and 7 show a modification wherein a single clamping plate U-shaped in end view is used, the limbs 3ᵇ being disposed one on either side of the struts or bracing members 2 and the yoke 3ᶜ passing around the upper part of the longéron 1. The ends 2ᶜ of the struts 2 are in this case compressed or otherwise shaped to an elliptical or oval shape in cross section with the longer axis of the same length as the diameter of the longéron 1 and disposed between the limbs of the clamping plate. In other respects the construction shown in these figures is similar to that described with reference to Figures 1-4 inclusive.

Figure 8 shows a modification wherein the struts or bracing members 2 are of smaller diameter than the longéron 1 but are not specially shaped at the ends. The joint is made by two clamping plates having straight portions 3 and curved portions 3ᵈ shaped to embrace the sides of the longéron. In this construction a shaped distance piece 14 is disposed between the wiring plate 12 and the adjacent clamping plate as shown.

Figure 9 shows in end view another construction which may be considered either a slight modification of that shown in Figures 1-4 inclusive or Figures 5-7 inclusive. In this construction the clamping plates 3 are of simple flat form as compared with the clamping plates with curved upper portions as shown in Figure 3 or the U-shaped clamping plate shown in Figure 6. Moreover in this construction the ends of the members abutting against the longéron are cut to V-shape as shown at 15 whereas in the previous constructions they are cut to curved shape to conform to the shape of the under side of the longéron. In all cases the ends of the said members are preferably cut to abut against each other over an extended area as indicated for example by the dotted line 16 in Figure 1.

As an obvious modification a plurality of bolts, rivets or like fastening means may be provided through the said second mentioned member or longéron, one or more thereof being adapted to engage the end of a transverse strut or like member.

We claim:—

1. A skeleton structure such as a fuselage for aircraft, comprising a tubular member, other tubular members with their ends abutting the first tubular member at an intermediate point in its length, a joint connecting the first mentioned member with the second mentioned members, comprising an inverted U-shaped clamping plate, a single bolt projecting through opposite sides of the clamping plate and the first mentioned tubular member to secure the plate, and other bolts for attaching the plate to the second mentioned tubular members.

2. A skeleton structure such as a fuselage for aircraft, comprising a metal tubular member, another metal tubular member with its end abutting the first mentioned member intermediate its ends to constitute a joint, the second member being of a different diameter at its joint end from that of the other portion thereof, an inverted U-shaped clamping plate embracing at its closed end, the first mentioned member, the arms of said plate projecting over the end of the second mentioned member, a single bolt for the opposite sides of the clamping plate and first mentioned tubular member, and further fastening means for securing the sides of the clamping plate to the second tubular member.

F. SIGRIST.
SYDNEY CAMM.